United States Patent
Shiota et al.

(10) Patent No.: US 10,950,126 B2
(45) Date of Patent: Mar. 16, 2021

(54) VEHICLE DISPLAY DEVICE FOR DISPLAYING AN OBSTACLE WARNING

(71) Applicant: Yazaki Corporation, Tokyo (JP)

(72) Inventors: Takashi Shiota, Shizuoka (JP); Kenichi Nagahashi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/740,379

(22) Filed: Jan. 10, 2020

(65) Prior Publication Data
US 2020/0234583 A1  Jul. 23, 2020

(30) Foreign Application Priority Data
Jan. 18, 2019  (JP) .............................. JP2019-006925

(51) Int. Cl.
*B60K 35/00* (2006.01)
*G06F 3/01* (2006.01)
*G08G 1/0969* (2006.01)

(52) U.S. Cl.
CPC ........... *G08G 1/0969* (2013.01); *B60K 35/00* (2013.01); *G06F 3/013* (2013.01); *B60K 2370/12* (2019.05); *B60K 2370/152* (2019.05); *B60K 2370/166* (2019.05); *B60K 2370/186* (2019.05)

(58) Field of Classification Search
CPC .......... G08G 1/0969; G06F 3/012–013; H04N 13/373; H04N 13/378; H04N 13/383; G09G 2380/10; B60K 35/00
See application file for complete search history.

(56) References Cited

U.S. PATENT DOCUMENTS

| 9,139,133 B2* | 9/2015 | Eng ...................... G08G 1/165 |
| 9,383,579 B2 | 7/2016 | Madau et al. |
| 2005/0024494 A1 | 2/2005 | Hirota et al. |
| 2009/0073263 A1 | 3/2009 | Harada et al. |
| 2010/0321176 A1* | 12/2010 | Hofmann ............... B60K 37/02 340/438 |
| 2013/0097557 A1 | 4/2013 | Madau et al. |
| 2014/0210604 A1 | 7/2014 | Kawashima et al. |
| 2016/0137126 A1* | 5/2016 | Fursich .............. H04N 5/23238 348/38 |
| 2017/0297603 A1* | 10/2017 | Murakami .............. G06F 3/016 |

FOREIGN PATENT DOCUMENTS

| JP | 2005-51403 A | 2/2005 |
| JP | 2013-82445 A | 5/2013 |
| JP | 2014-145999 A | 8/2014 |
| JP | 2018-76019 A | 5/2018 |
| KR | 2015-0051671 A | 5/2015 |

* cited by examiner

*Primary Examiner* — Laurence J Lee
*Assistant Examiner* — Larry Lee
(74) *Attorney, Agent, or Firm* — Kenealy Vaidya LLP

(57) ABSTRACT

A vehicle display device includes a display part that is arranged in a vehicle and is configured to display a first image as an image of information related to the vehicle on a front side of a driver, a detector configured to detect an action of the driver, and a controller configured to change an image displayed on the display part from the first image to a second image when an action of the driver gazing at the first image is detected. The first image includes an image of the vehicle, for example.

8 Claims, 12 Drawing Sheets

FIG.7
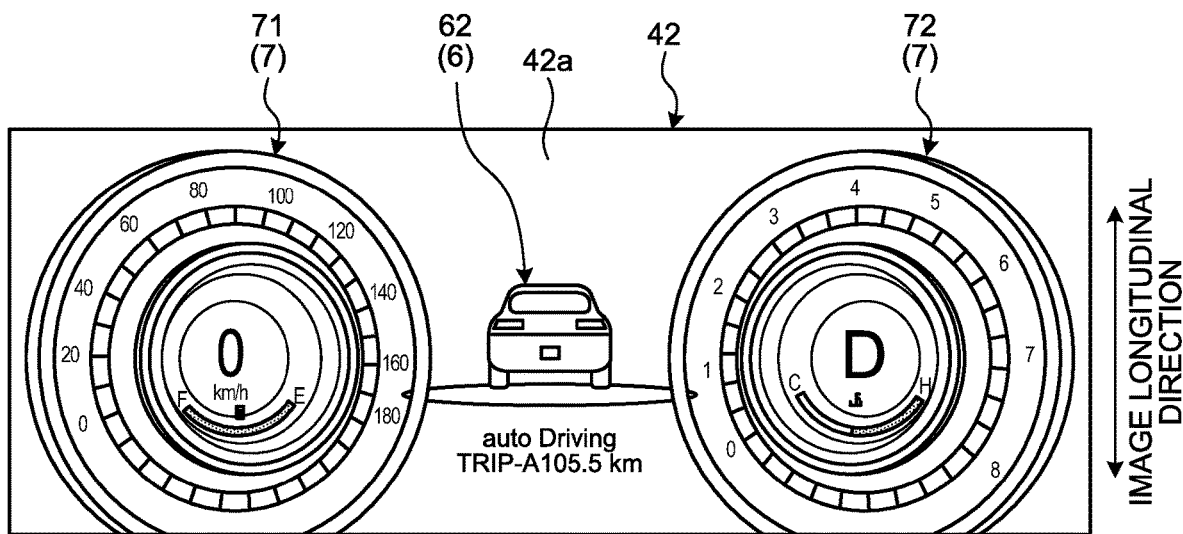
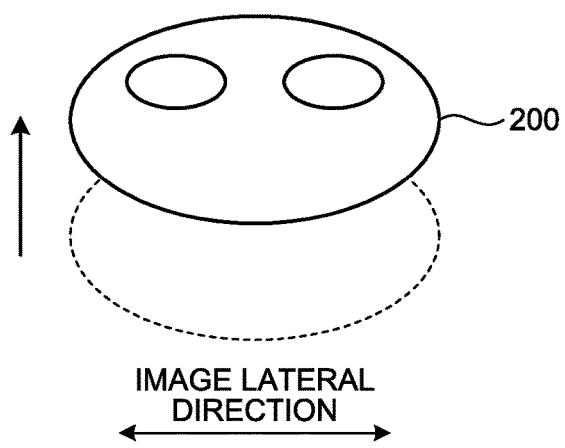
IMAGE LATERAL DIRECTION

FIG.8
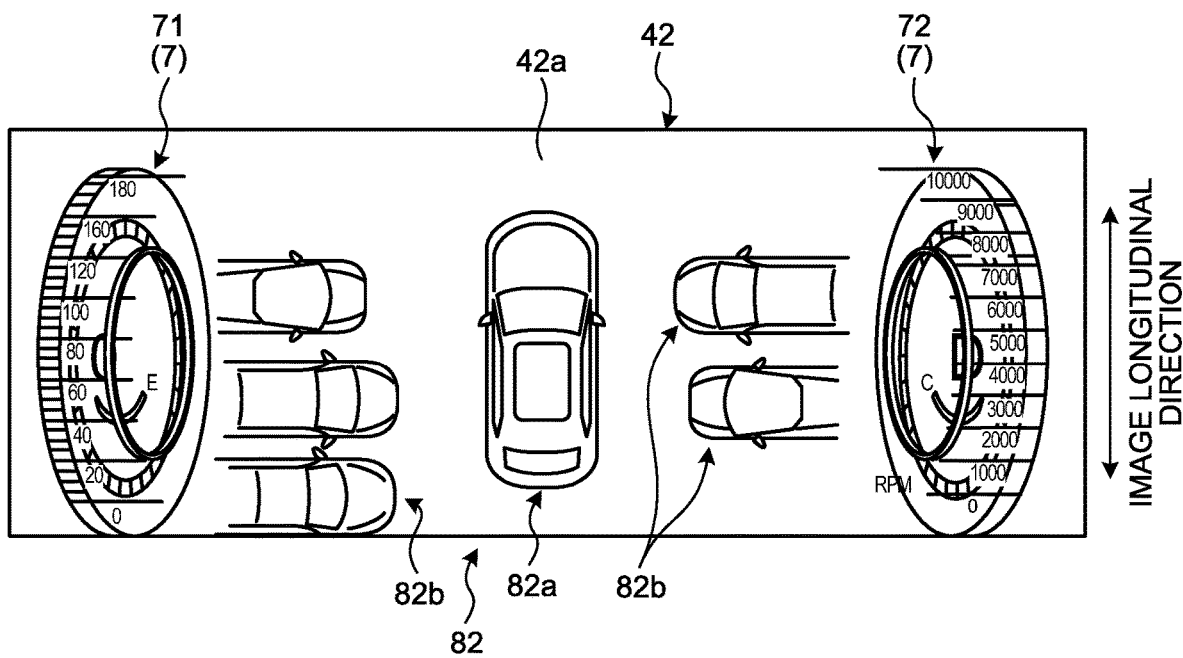
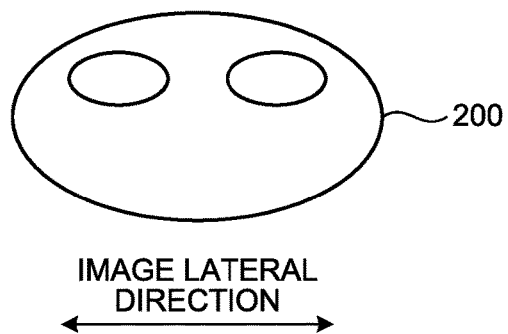
IMAGE LATERAL
DIRECTION

VEHICLE DISPLAY DEVICE FOR DISPLAYING AN OBSTACLE WARNING

CROSS-REFERENCE TO RELATED APPLICATION(S)

The present application claims priority to and incorporates by reference the entire contents of Japanese Patent Application No. 2019-006925 filed in Japan on Jan. 18, 2019.

BACKGROUND OF THE INVENTION

1. Field of the Invention

The present invention relates to a vehicle display device.

2. Description of the Related Art

Conventionally, there exists a display device that displays images of surroundings of a vehicle. Japanese Patent Application Laid-open No. 2005-51403 discloses the technology of a vehicle surroundings display device that captures images of surroundings of a vehicle using a camera and displays the images of surroundings of the vehicle on a monitor in the vehicle interior. The vehicle surroundings display device of Japanese Patent Application Laid-open No. 2005-51403 is capable of automatically displaying images of surroundings of a vehicle on a monitor.

The display device for a vehicle displaying information related to a vehicle preferably achieves display fitting for the sense of a driver. For example, if a request from a driver is inferred on the basis of his/her natural action and the information in accordance with the request is displayed, this achieves display fitting for the sense of a driver.

SUMMARY OF THE INVENTION

The invention aims at providing a vehicle display device capable of achieving display fitting for the sense of a driver.

In order to achieve the above mentioned object, a vehicle display device according to one aspect of the present invention includes a display part that is arranged in a vehicle and is configured to display a first image as an image of information related to the vehicle on a front side of a driver; a detector configured to detect an action of the driver; and a controller configured to change an image displayed on the display part from the first image to a second image when an action of the driver gazing at the first image is detected.

According to another aspect of the present invention, in the vehicle display device, it is preferable that the first image includes an image of the vehicle.

According to still another aspect of the present invention, in the vehicle display device, it is preferable that the second image is an image of detailed information related to the first image.

According to still another aspect of the present invention, in the vehicle display device, it is preferable that the action of the driver gazing at the first image includes an action of the driver making his/her face approach the first image.

According to still another aspect of the present invention, in the vehicle display device, it is preferable that the first image is an image of route guidance by a navigation device, and the second image is an image of detailed display of the route guidance.

According to still another aspect of the present invention, in the vehicle display device, it is preferable that the first image is an image of the vehicle that is stopped, and the second image is a bird's-eye image displaying the vehicle and an object around the vehicle.

According to still another aspect of the present invention, in the vehicle display device, it is preferable that the first image is an image warning of approach of the vehicle to an object around the vehicle, and the second image is an image displaying the object around the vehicle and a part of the vehicle approaching the object around the vehicle.

According to still another aspect of the present invention, in the vehicle display device, it is preferable that the display part is configured to display a meter image related to a travelling state of the vehicle in addition to the first image, and the controller is configured to reduce a display range of the meter image and display the second image in a larger area than a display range of the first image when the action of the driver gazing at the first image is detected.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a diagram illustrating a gazing action of a driver;

FIG. 8 is a diagram illustrating a second image according to the second embodiment;

DETAILED DESCRIPTION OF THE PREFERRED EMBODIMENTS

The following will describe in detail a vehicle display device according to embodiments of the invention with reference to the enclosed drawings. Note that the embodiments do not limit the invention. Moreover, the components in the following embodiments include components that a person skilled in the art could easily arrive at or components that are substantially same.

First Embodiment

Figure 1:
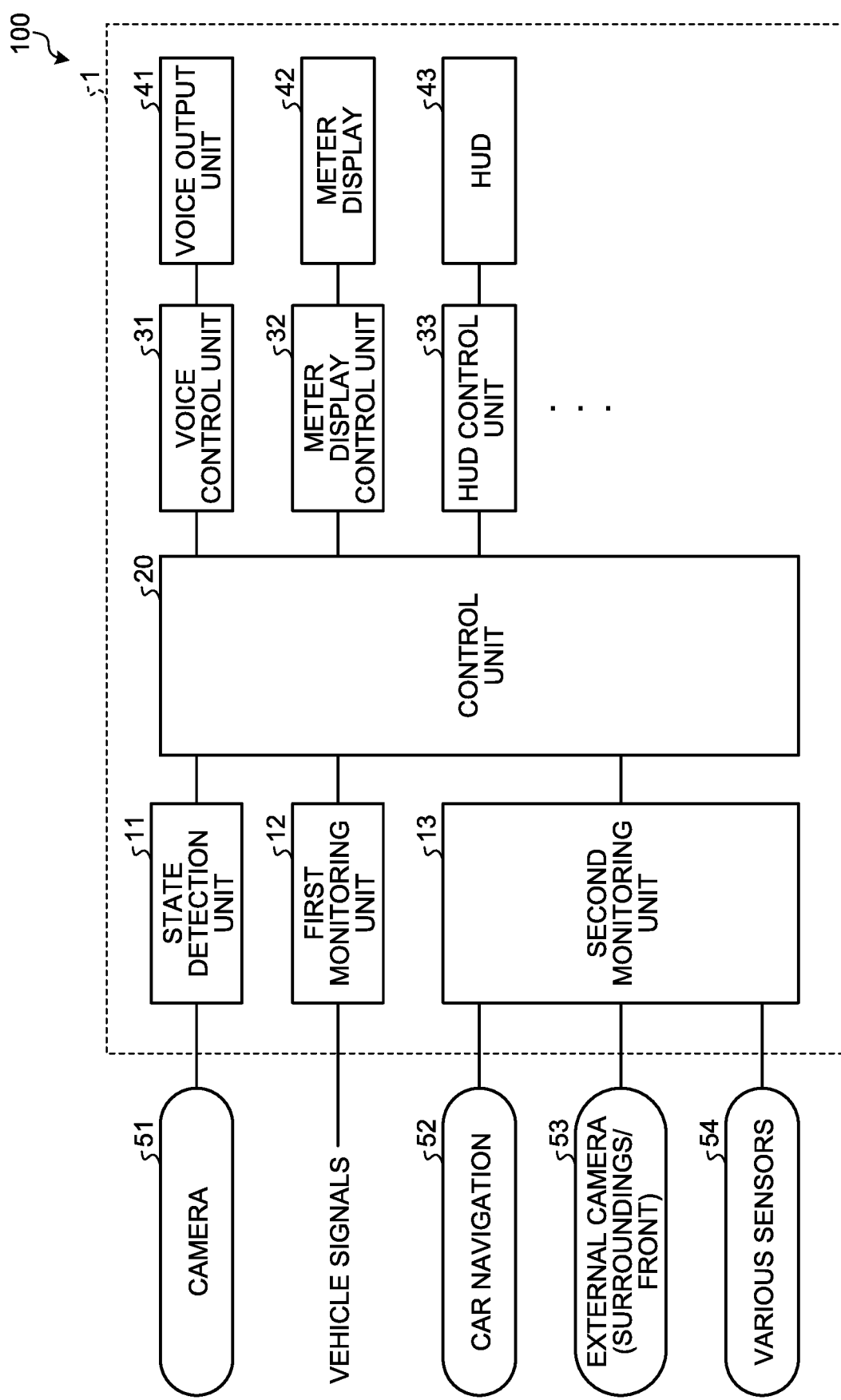
FIG. 1 is a block diagram illustrating a vehicle display device according to a first embodiment.
Figure 2:
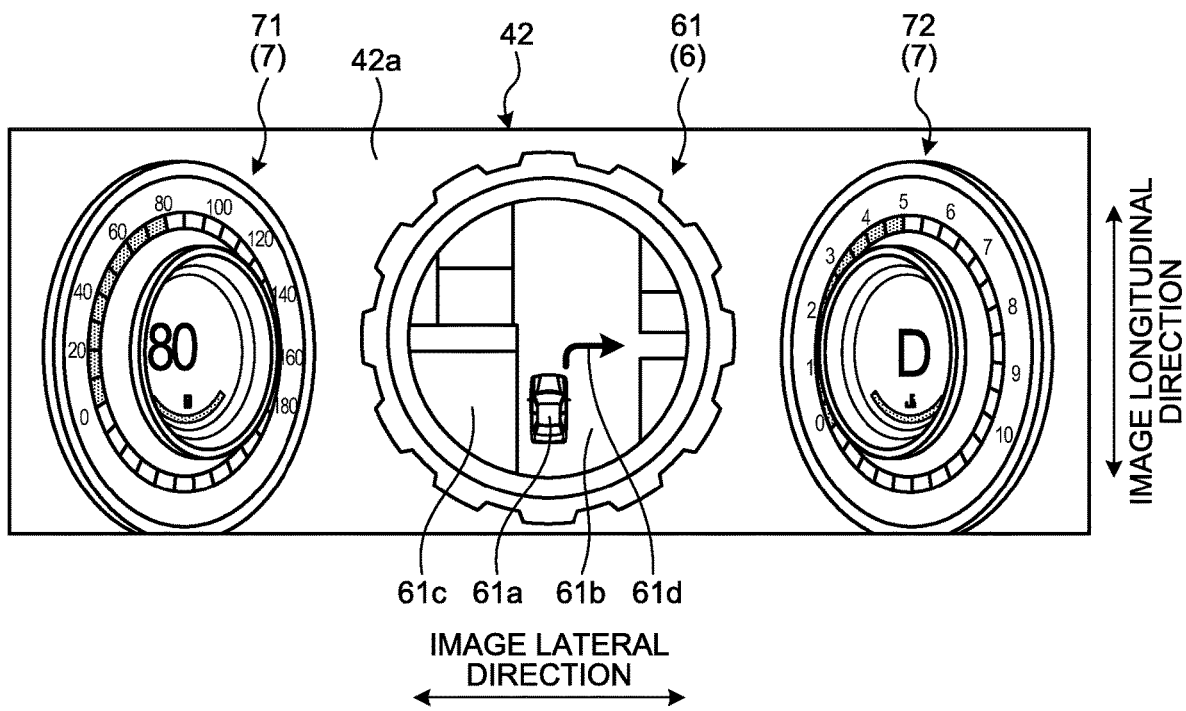
FIG. 2 is a diagram illustrating a first image according to the first embodiment.
Figure 3:
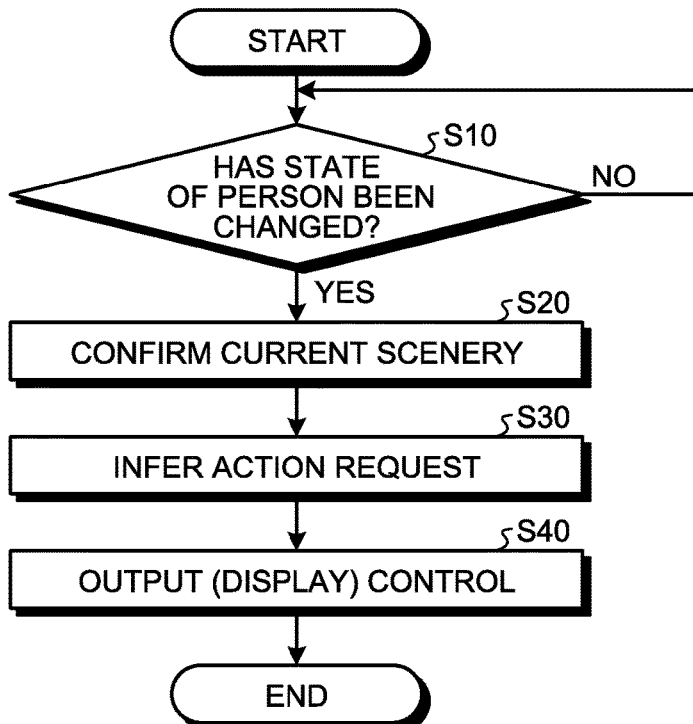
FIG. 3 is a flowchart illustrating the action of the vehicle display device according to the first embodiment.
Figure 4:
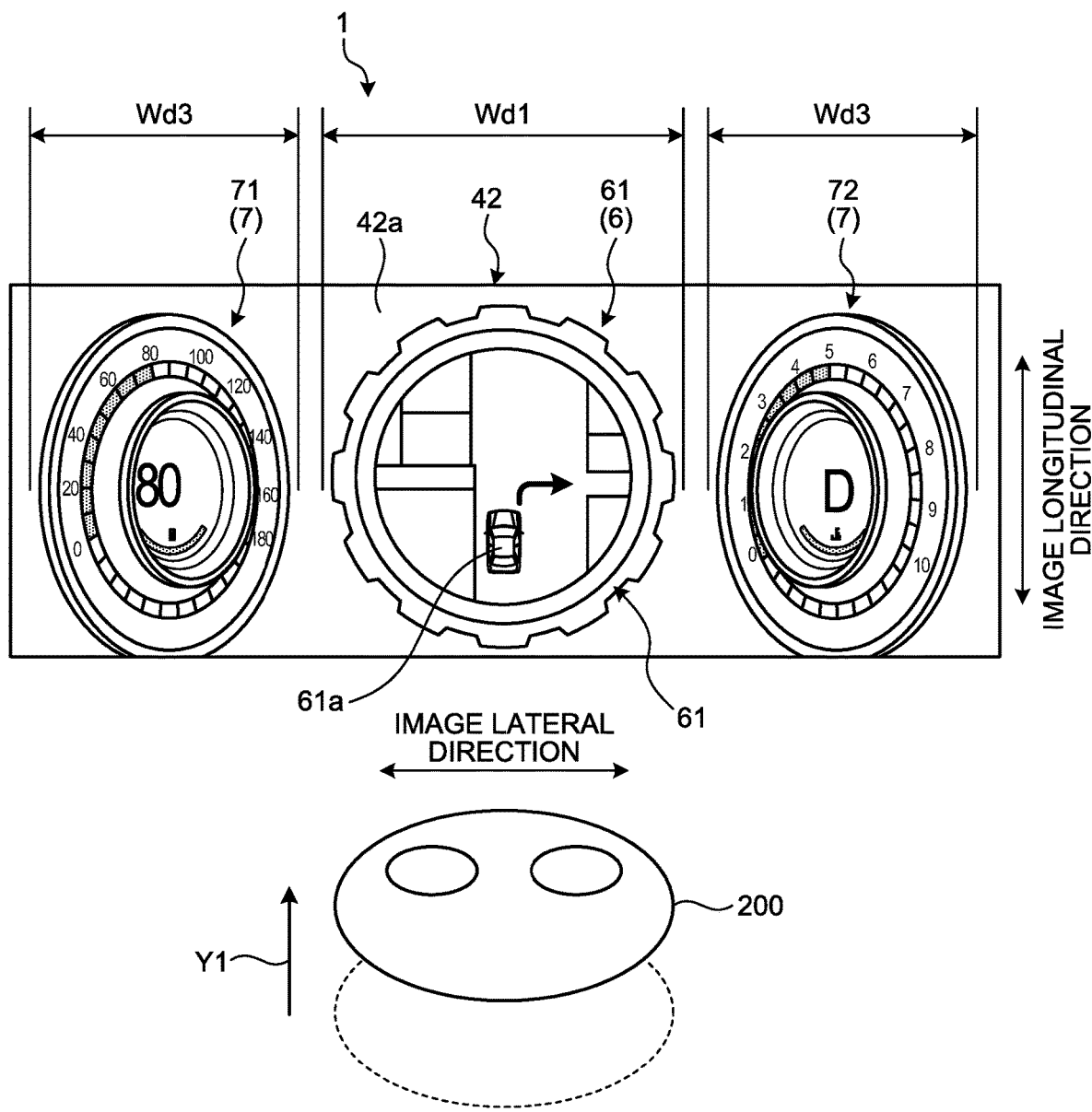
FIG. 4 is a diagram illustrating a gazing action of a driver.
Figure 5:
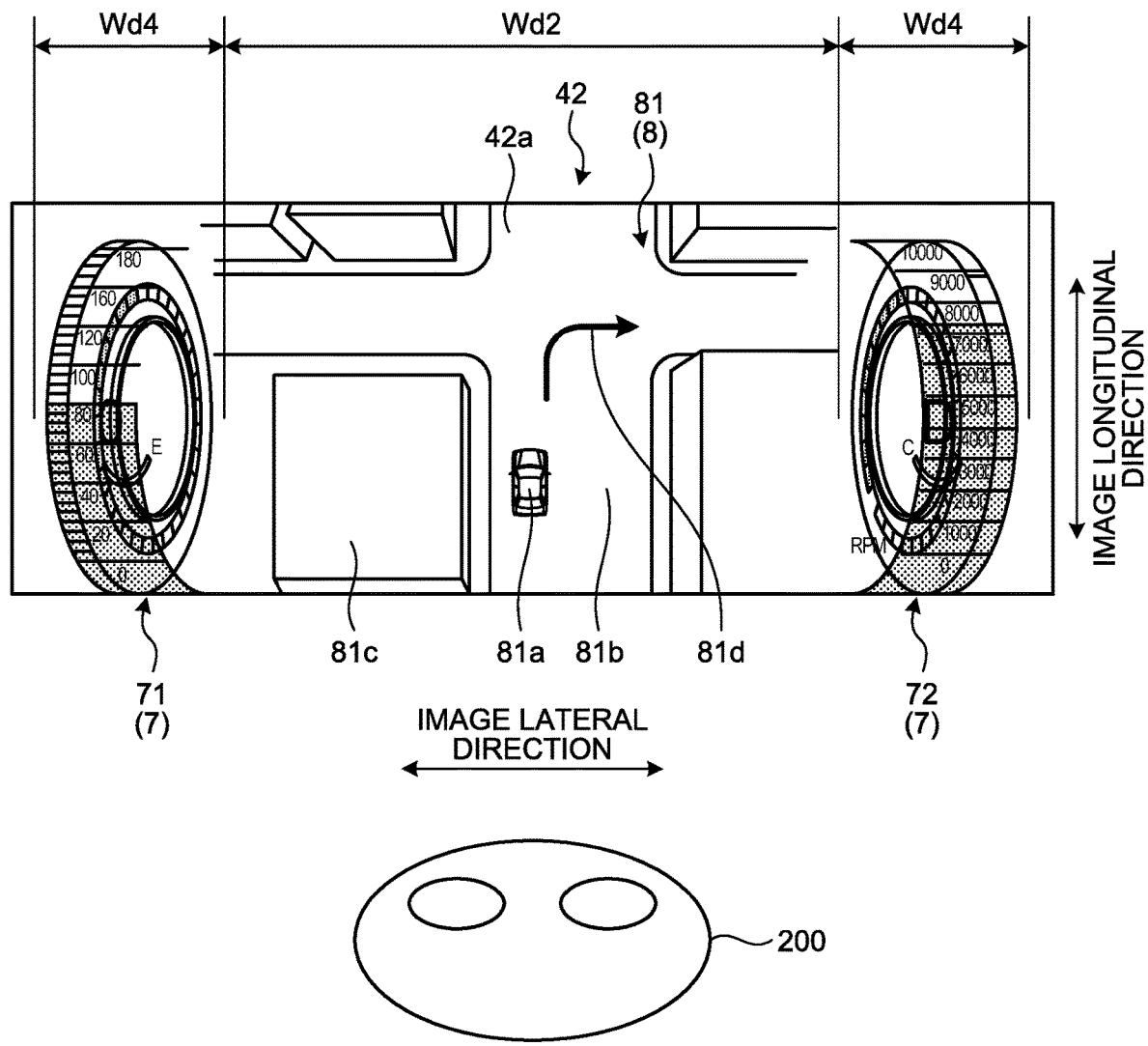
FIG. 5 is a diagram illustrating a second image according to the first embodiment.

A first embodiment will be described with reference to FIG. 1 to FIG. 5. The first embodiment relates to a vehicle display device. FIG. 1 is a block diagram illustrating a vehicle display device according to the first embodiment. FIG. 2 is a diagram illustrating a first image according to the first embodiment. FIG. 3 is a flowchart illustrating the action of the vehicle display device according to the first embodiment. FIG. 4 is a diagram illustrating a gazing action of a driver. FIG. 5 is a diagram illustrating a second image according to the first embodiment.

As illustrated in FIG. 1, a vehicle display device according to the first embodiment includes a state detection unit 11, a first monitoring unit 12, a second monitoring unit 13, a control unit 20, a voice control unit 31, a meter display control unit 32, a head-up display (HUD) control unit 33, a voice output unit 41, a meter display 42, and a HUD 43. The vehicle display device is a display device provided in a vehicle 100. The vehicle display device displays various images on the front side of a driver 200. In the vehicle display device according to the first embodiment, the meter display 42 displays various images including a first image 6 and a second image 8 described later.

The state detection unit 11 detects a state of the driver 200 (see FIG. 4) in the vehicle 100. The state detection unit 11 is, for example, an integrated circuit or a microcomputer configured to execute a detection action according to the first embodiment. The state detection unit 11 is connected electrically with a camera 51 arranged in the vehicle 100. The camera 51 is arranged on the front side of the driver 200 in the vehicle interior, for example. The camera 51 captures an image of the driver 200 including his/her face. The state detection unit 11 analyzes image data obtained from the camera 51 and detects the state of the driver 200. The state detection unit 11 detects a direction of the face of the driver 200, a position and a movement of the head of the driver 200, a visual line direction of the driver 200, and the like. The detection result by the state detection unit 11 is transmitted to the control unit 20.

The first monitoring unit 12 monitors the state of the vehicle 100. The first monitoring unit 12 is, for example, an integrated circuit or a microcomputer configured to execute a monitoring action according to the first embodiment. The first monitoring unit 12 receives various vehicle signals. The vehicle signals include signals indicating a travelling speed of the vehicle 100 and signals indicating a shift position of the vehicle 100, for example. On the basis of received vehicle signals, the first monitoring unit 12 monitors whether the vehicle 100 is travelling or stopped, for example. The monitoring result by the first monitoring unit 12 is transmitted to the control unit 20.

The second monitoring unit 13 monitors the driving state of the vehicle 100 and surrounding environments of the vehicle 100. The second monitoring unit 13 is, for example, an integrated circuit or a microcomputer configured to execute a monitoring action according to the first embodiment. The second monitoring unit 13 is electrically connected to a car navigation 52, an external camera 53, and various sensors 54. The car navigation 52 is a navigation device having a function of route guidance for the vehicle 100. During route guidance, the car navigation 52 transmits information related to route guidance to the second monitoring unit 13. The information related to route guidance includes information of images displayed on the meter display 42, for example. The second monitoring unit 13 transmits information received from the car navigation 52 to the control unit 20.

The external camera 53 is a camera that captures images of the outside of the vehicle 100. The external camera 53 captures images of the front side, lateral sides, and rear side of the vehicle 100, for example. The image data captured by the external camera 53 is transmitted to the second monitoring unit 13. The second monitoring unit 13 transmits the image data received from the external camera 53 to the control unit 20.

The various sensors 54 are sensors that detect surrounding environments of the vehicle 100. The various sensors 54 include a corner sensor detecting objects around the vehicle 100. The corner sensor is an ultrasonic sensor, for example. The various sensors 54 may include a sensor detecting a preceding vehicle and a sensor detecting a following vehicle. The detection result by the various sensors 54 is transmitted to the second monitoring unit 13. The second monitoring unit 13 transmits the information received from the various sensors 54 to the control unit 20.

The control unit 20 infers a request from the driver 200 on the basis of the state of the driver 200 and the state of contents (scenery). The control unit 20 is, for example, an integrated circuit or a microcomputer configured to execute a control action according to the first embodiment. The control unit 20 performs control of the devices, such as switching of display on the meter display 42, on the basis of the inference result. The control unit 20 according to the first embodiment controls display contents to be displayed on the meter display 42 on the basis of the state of the driver 200 obtained from the state detection unit 11, the state of the vehicle 100 obtained from the first monitoring unit 12, and the information obtained from the second monitoring unit 13. The detail of the action of the control unit 20 will be described later.

The voice control unit 31 controls the voice output unit 41. The voice output unit 41 is a device that outputs sound, such as a speaker or a buzzer provided in the vehicle 100. The voice control unit 31 drives the voice output unit 41 in accordance with an order from the control unit 20 so that the voice output unit 41 outputs voice.

The meter display control unit 32 controls the meter display 42. The meter display 42 is a device arranged on the front side of the driver 200 in the vehicle 100, and is arranged in an instrument panel, for example. The meter display 42 displays images by a liquid crystal display device such as a thin film transistor-liquid crystal display (TFT-LCD), for example. The meter display 42 according to the first embodiment includes a rectangular display part 42a. The meter display 42 is capable of displaying optional images at optional positions on the display part 42a. The meter display 42 displays images on the display part 42a in accordance with an order from the control unit 20.

The HUD 43 is a head-up display device. The HUD 43 projects an image on a reflection part on the front side of the driver 200. The HUD 43 projects an image on a wind shield on the front side of the driver 200, for example. The image reflected by the wind shield is visually recognized as a virtual image formed at a position on more front side than the wind shield. The HUD 43 displays various kinds of information by virtual images. The HUD 43 projects images on the reflection part in accordance with an order from the control unit 20.

The control unit 20 according to the first embodiment displays the first image 6 (see FIG. 2) on the display part 42a, as described in the following. When the action of the driver 200 gazing at the first image 6 is detected, the control unit 20 changes the image displayed on the display part 42a from the first image 6 to the second image 8. The first image 6 according to the first embodiment is an image 61 of route guidance by the car navigation 52. The second image 8 is an image 81 (see FIG. 5) of detailed display of route guidance by the car navigation 52. When the driver 200 gazes at the image 61 of route guidance, the vehicle display device according to the first embodiment displays the detail of the route guidance. This achieves information display fitting for the sense of the driver 200.

During route guidance by the car navigation 52, the control unit 20 controls the meter display 42 to display the image 61 of route guidance as the first image 6, as illustrated in FIG. 2. The image 61 of route guidance includes a bird's-eye image 61*a* of the vehicle 100, an image 61*b* of a road, an image 61*c* of surrounding structures, and an image 61*d* of an arrow indicating a travelling direction at a branch point. FIG. 2 illustrates an arrow for right-turn as the image 61*d* of an arrow. The image 61 of route guidance as the first image 6 is an image for simple display. The image 61 of route guidance is displayed in the center part in the image lateral direction on the display part 42*a*.

The display part 42*a* displays a meter image 7 in addition to the image 61 of route guidance. The meter image 7 is an image of a meter related to the traveling state of the vehicle 100. The meter image 7 according to the first embodiment includes a vehicle speed image 71 and a rotational speed image 72. The vehicle speed image 71 is an image displaying a traveling speed of the vehicle 100. The vehicle speed image 71 is displayed on one side in the image lateral direction relative to the image 61 of route guidance. The rotational speed image 72 is an image displaying a rotational speed of an engine provided in the vehicle 100. The rotational speed image 72 displays a rotational speed of an internal combustion engine, for example. The rotational speed image 72 is displayed on the other side in the image lateral direction relative to the image 61 of route guidance.

The following will describe the action of the control unit 20 according to the first embodiment with reference to FIG. 3. At Step S10, the control unit 20 determines whether the state of a person has been changed. The control unit 20 performs determination at Step S10 on the basis of the state of the driver 200 obtained from the state detection unit 11. The control unit 20 compares the latest state of the driver 200 with the previous state of the driver 200, for example. In the case of positive determination that the state of the driver 200 has been changed (Yes at Step S10), the processing is advanced to Step S20. In the case of negative determination that the state of the driver 200 has not been changed (No at Step S10), the determination at Step S10 is repeated.

At Step S20, the control unit 20 confirms the current scenery. The current scenery includes, for example, the first image 6 displayed on the display part 42*a*, surrounding environments captured by the external camera 53, surrounding objects detected by the various sensors 54, the current position of the vehicle 100, and the like. In other words, the current scenery includes the kind of information provided by the meter display 42 to the driver 200, the presence/absence of obstacles around the vehicle 100, surrounding environments of the vehicle 100, and a travelling position of the vehicle 100. The control unit 20 confirms the contents of the image displayed on the meter display 42, image data captured by the external camera 53, detection results of the various sensors 54, and the like. After Step S20, the processing is advanced to Step S30.

At Step S30, the control unit 20 infers an action request. The control unit 20 infers a request from the driver 200 on the basis of the state change of the driver 200 detected at Step S10 and the information of the current scenery obtained at Step S20. Here, there will be described the inference of an action request in the case where the image 61 of route guidance is displayed on the meter display 42.

The control unit 20 determines whether the action of the driver 200 gazing at the image 61 of route guidance has been detected. In the following description, the action of the driver 200 gazing at the first image 6 such as the image 61 of route guidance is referred to simply as a "gazing action". The gazing action includes an action of the driver 200 directing his/her visual line to the first image 6, for example. The gazing action may include an action of the driver 200 keeping his/her visual line directed to the first image 6. For example, if a certain period of time has elapsed while the driver 200 keeps his/her visual line directed to the first image 6, it may be determined that the gazing action has been made. The gazing action may include an action illustrated with the arrow Y1 in FIG. 4, that is, an action of the driver 200 making his/her face approach the first image 6.

If the image 61 of route guidance is displayed as the first image 6 and the gazing action of the driver 200 is detected, it is inferred that the driver 200 requests the detail of route guidance. When the action of gazing at the image 61 of route guidance is detected, the control unit 20 according to the first embodiment infers at Step S30 that the driver 200 requests an action of displaying the detail of route guidance. When the action request is inferred at Step S30, the processing is advanced to Step S40. Note that the control unit 20 may infer at Step S30 that no action request has been made. For example, when the state change of the driver 200 detected at Step S10 is different from the change indicating an action request, the control unit 20 may determine that no action request has been made.

At Step S40, the control unit 20 performs output control. The output control is typically display control of the meter display 42. The control unit 20 orders the display contents of the display part 42*a* to the meter display 42 on the basis of the action request inferred at Step S30. When the gazing action at the image 61 of route guidance is detected, the control unit 20 according to the first embodiment replaces the first image 6 with the second image 8 for display on the meter display 42.

The second image 8 according to the first embodiment is the image 81 of detailed display of route guidance (hereinafter, referred to simply as a "detailed image") as illustrated in FIG. 5. The detailed image 81 includes a bird's-eye image 81*a* of the vehicle 100, an image 81*b* of a road, an image 81*c* of surrounding structures, and an image 81*d* of an arrow. The detailed image 81 is shown as a bird's-eye image in which the vehicle 100 and a road are viewed from directly above. Thus, the road as a destination after right-turn is recognized easily. Moreover, the detailed image 81 shows a larger range of surroundings of the vehicle 100 than the image 61 of route guidance illustrated in FIG. 4. Thus, the surrounding environments of the vehicle 100 are grasped more easily. The image 81*c* of surrounding structures in the detailed image 81 may be a more detailed image than the image 61*c* of surrounding structures in the first image 6. For example, in the detailed image 81, the image 81*c* of surrounding structures may be an image reproducing the actual shapes and colors of the structures.

In the display part 42*a*, the range where the detailed image 81 is displayed is larger than the range where the image 61 of route guidance is displayed. For example, in the image lateral direction, a width Wd2 (FIG. 5) with which the detailed image 81 is displayed is larger than a width Wd1 (FIG. 4) with which the image 61 of route guidance is displayed. Moreover, the image 61 of route guidance is displayed in a circular area, while the detailed image 81 is displayed in an area from the upper end to the lower end in the display part 42*a*. Therefore, the display range of the detailed image 81 is expanded in both the image longitudinal direction and the image lateral direction than the display range of the image 61 of route guidance.

To display the detailed image 81, the control unit 20 reduces a display range of the meter image 7. In the case where the detailed image 81 is displayed, a width Wd4 (FIG. 5) of the meter image 7 in the image lateral direction is smaller than a width Wd3 (FIG. 4) of the meter image 7 in the case where the image 61 of route guidance is displayed. The position of the meter image 7 in the case where the detailed image 81 is displayed is closer to the end in the image lateral direction than the position of the meter image 7 in the case where the image 61 of route guidance is displayed. With the smaller width Wd4 of the meter image 7, a larger area is secured to display the detailed image 81.

As described above, the vehicle display device according to the first embodiment displays the detailed image 81 when the gazing action at the image 61 of route guidance has been made. The action of gazing at the image 61 of route guidance is a natural action of the driver 200 when he/she desires to confirm the detail of the image 61 of route guidance. It is considered that when the driver 200 desires to confirm the detail of the image 61 of route guidance, for example, he/she unconsciously brings his/her face closer to the image 61 of route guidance or looks into the image 61 of route guidance. When such an action is detected, the detailed image 81 is displayed. This achieves guiding display fitting for the sense of the driver 200. The action request from the driver 200 is inferred on the basis of a naturally occurring action, and the image is then switched. This makes it unnecessary for the driver 200 to perform operation for switching display.

Note that at Step S40, the control unit 20 may control the voice output unit 41 to output a voice message indicating that the image 61 of route guidance is switched to the detailed image 81. After Step S40, the control flow is finished.

As described above, the vehicle display device of the first embodiment includes the display part 42a, the state detection unit 11, and the control unit 20. The display part 42a is arranged in the vehicle 100, and displays the first image 6 that is an image of information related to the vehicle 100 on the front side of the driver 200. The state detection unit 11 detects an action of the driver 200. When the action of the driver 200 gazing at the first image 6 is detected, the control unit 20 changes the image displayed on the display part 42a from the first image 6 to the second image 8.

The vehicle display device according to the first embodiment is capable of inferring a request from the driver 200 on the basis of the action of gazing at the first image 6 and displaying the second image 8 in accordance with the request on the display part 42a. Therefore, the vehicle display device according to the first embodiment achieves display fitting for the sense of the driver 200.

The first image 6 according to the first embodiment includes an image of the vehicle 100. The control unit 20 is capable of inferring a request from the driver 200 on the basis of the action of gazing at the first image 6 including an image of the vehicle 100.

The second image 8 according to the first embodiment is an image of detailed information related to the first image 6. The second image 8 including the detailed information is displayed in accordance with the action of gazing at the first image 6. This achieves display fitting for the sense of the driver 200.

The action of the driver 200 gazing at the first image 6 may include an action of the driver 200 making his/her face approach the first image 6. It is considered that when the driver 200 pays attention to the first image 6, he/she unconsciously brings his/her face closer to the first image 6. It is inferred that such an action indicates a request from the driver 200 for more information. Therefore, when the driver 200 makes his/her face approach the first image 6, the second image 8 is displayed, which achieves display fitting for the sense of the driver 200.

The first image 6 according to the first embodiment is the image 61 of route guidance by the car navigation 52, while the second image 8 is the image 81 of detailed display of route guidance. The image 81 of detailed display of route guidance is displayed in accordance with the action of gazing at the image 61 of route guidance. This achieves display fitting for the sense of the driver 200.

The display part 42a according to the first embodiment displays the meter image 7 related to the traveling state of the vehicle 100 in addition to the first image 6. When the action of the driver 200 gazing at the first image 6 is detected, the control unit 20 reduces a display range of the meter image 7, and displays the second image 8 in a larger area than the display range of the first image 6. This allows the vehicle display device according to the first embodiment to provide more information and detailed information by the second image 8 to the driver 200.

Note that when the gazing action of the driver 200 is finished, the control unit 20 may change the image displayed on the display part 42a from the second image 8 to the first image 6. For example, the control unit 20 may display the second image 8 on the display part 42a while the driver 200 is gazing at the second image 8, and when the action of the driver gazing at the second image 8 is finished, the control unit 20 may replace the second image 8 with the first image 6 for display on the display part 42a. When the state of the driver 200 keeping his/her visual line directed to a different direction from the second image 8 has continued for a given period of time, for example, the control unit 20 may determine that the gazing action at the second image 8 is finished.

The control unit 20 may replace the second image 8 with the first image 6 for display in accordance with operation input by the driver 200. For example, the operation menu for operating display contents of the meter display 42 may include a menu item for finishing display of the second image 8. When the display of the second image 8 has become unnecessary, the driver 200 may select the menu item for finishing display of the second image 8 to finish display of the second image 8.

Second Embodiment

Figure 6:
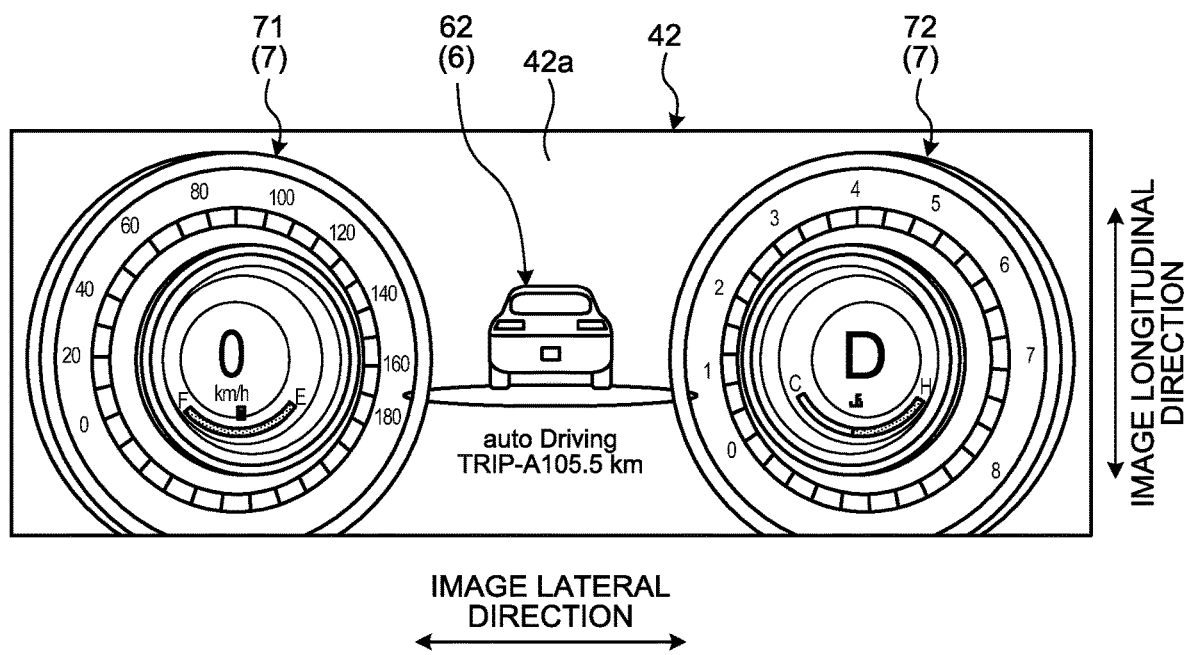
FIG. 6 is a diagram illustrating a first image according to a second embodiment.

A second embodiment will be described with reference to FIG. 6 to FIG. 8. In the second embodiment, the components having the same function as those described in the first embodiment are represented with the same referential symbols, and the repeated explanation thereof is omitted. FIG. 6 is a diagram illustrating a first image according to the second embodiment. FIG. 7 is a diagram illustrating a gazing action. FIG. 8 is a diagram illustrating a second image according to the second embodiment. The second embodiment is different from the above-described first embodiment in the aspect that an around view of the vehicle 100 is displayed as the second image 8, for example.

As illustrated in FIG. 6, the display part 42a displays an own vehicle image 62 as the first image 6. The own vehicle image 62 is an image of the vehicle 100, and is an image of the vehicle 100 viewed from the rear side, for example. The own vehicle image 62 also displays a road surface where the vehicle 100 is stopped. If an object exists in the vicinity of the vehicle 100, at least a part of the object may be displayed in the own vehicle image 62. The own vehicle image 62 may be a bird's-eye image in which the vehicle 100 is viewed from the upper rear side. The own vehicle image 62 is displayed when the vehicle 100 is stopped or when the vehicle 100 is about to start, for example. In FIG. 6, in the state where the vehicle speed is 0 [km/h] and the shift position is in D, the display part 42a displays the own vehicle image 62.

The driver 200 intends to confirm whether an obstacle exists around the vehicle 100 before he/she starts the vehicle 100 or when he/she intends to start the vehicle 100. At that time, the driver 200 gazes at the own vehicle image 62 displayed on the meter display 42, as illustrated in FIG. 7, for example. When the action of the driver 200 gazing at the own vehicle image 62 is detected, the control unit 20 displays an around view image 82 as the second image 8, as illustrated in FIG. 8.

The around view image 82 is a bird's-eye image including an image 82a of the vehicle 100 and an image 82b of objects around the vehicle 100. That is, the around view image 82 is a bird's-eye image displaying the vehicle 100 and objects around the vehicle 100. The around view image 82 is generated from images of the surroundings of the vehicle 100 captured by the external camera 53, for example. The around view image 82 may be generated by the second monitoring unit 13 or the control unit 20. The around view image 82 of the second embodiment is generated from the image of the lateral sides of the vehicle 100, the image of the front side of the vehicle 100, and the image of the rear side of the vehicle 100.

In the around view image 82 illustrated in FIG. 8, other vehicles existing on the lateral sides of the vehicle 100 are shown as objects around the vehicle 100. Note that the surrounding object to be displayed is not limited to other vehicles on the lateral sides. As the surrounding object of the vehicle 100, a person, a structure, an animal, and the like around the vehicle 100, may be displayed in the around view image 82.

The around view image 82 is displayed on the display part 42a, which allows the driver 200 to easily confirm the situation of the surroundings of the vehicle 100. The own vehicle image 62 is switched to the around view image 82 by the natural action of gazing at the object to be confirmed. This makes it possible to provide information fitting for the sense of the driver 200.

In the display part 42a, the range where the around view image 82 is displayed is larger than the range where the own vehicle image 62 is displayed. To display the around view image 82, the control unit 20 reduces a display range of the meter image 7. With the smaller display range of the meter image 7, an area is secured to display the around view image 82.

As described above, the first image 6 of the second embodiment is an image of the stopped vehicle 100, and the second image 8 is a bird's-eye image displaying the vehicle 100 and objects around the vehicle 100. The bird's-eye image including the vehicle 100 and the surrounding objects is displayed in accordance with the action of gazing at the first image 6, which achieves display fitting for the sense of the driver 200.

Third Embodiment

Figure 9:
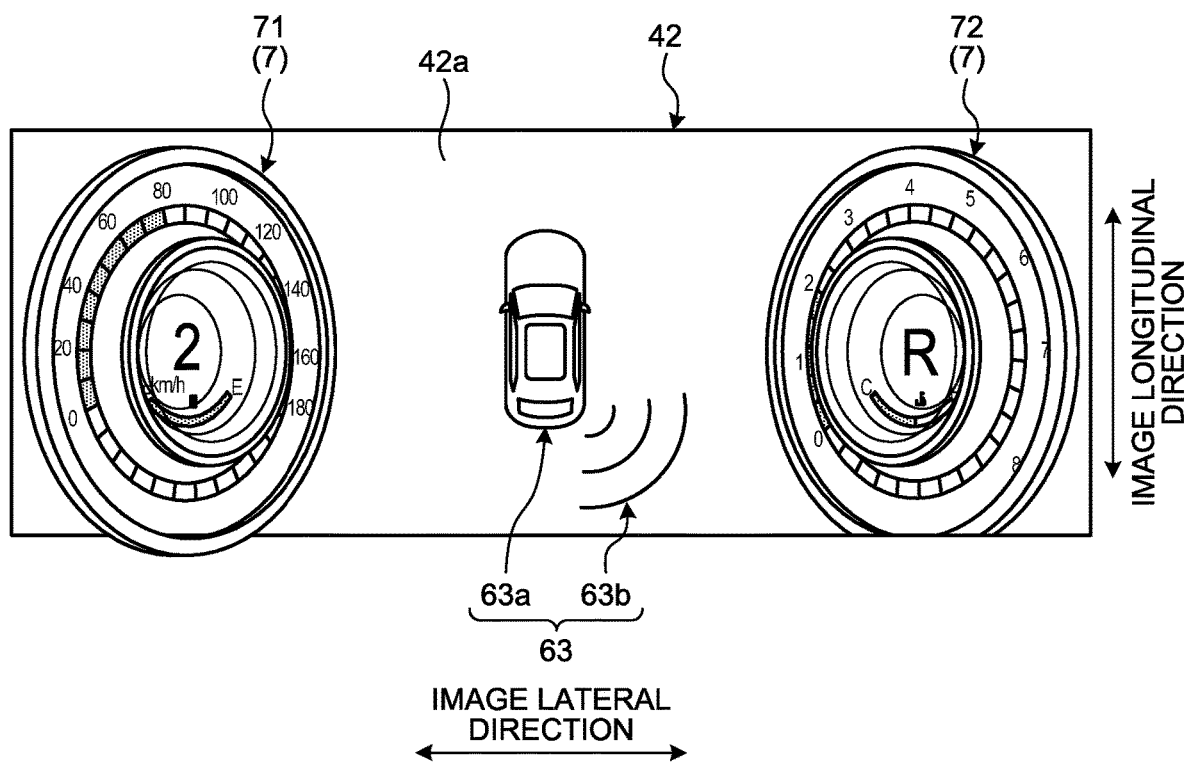
FIG. 9 is a diagram illustrating a first image according to a third embodiment.
Figure 10:
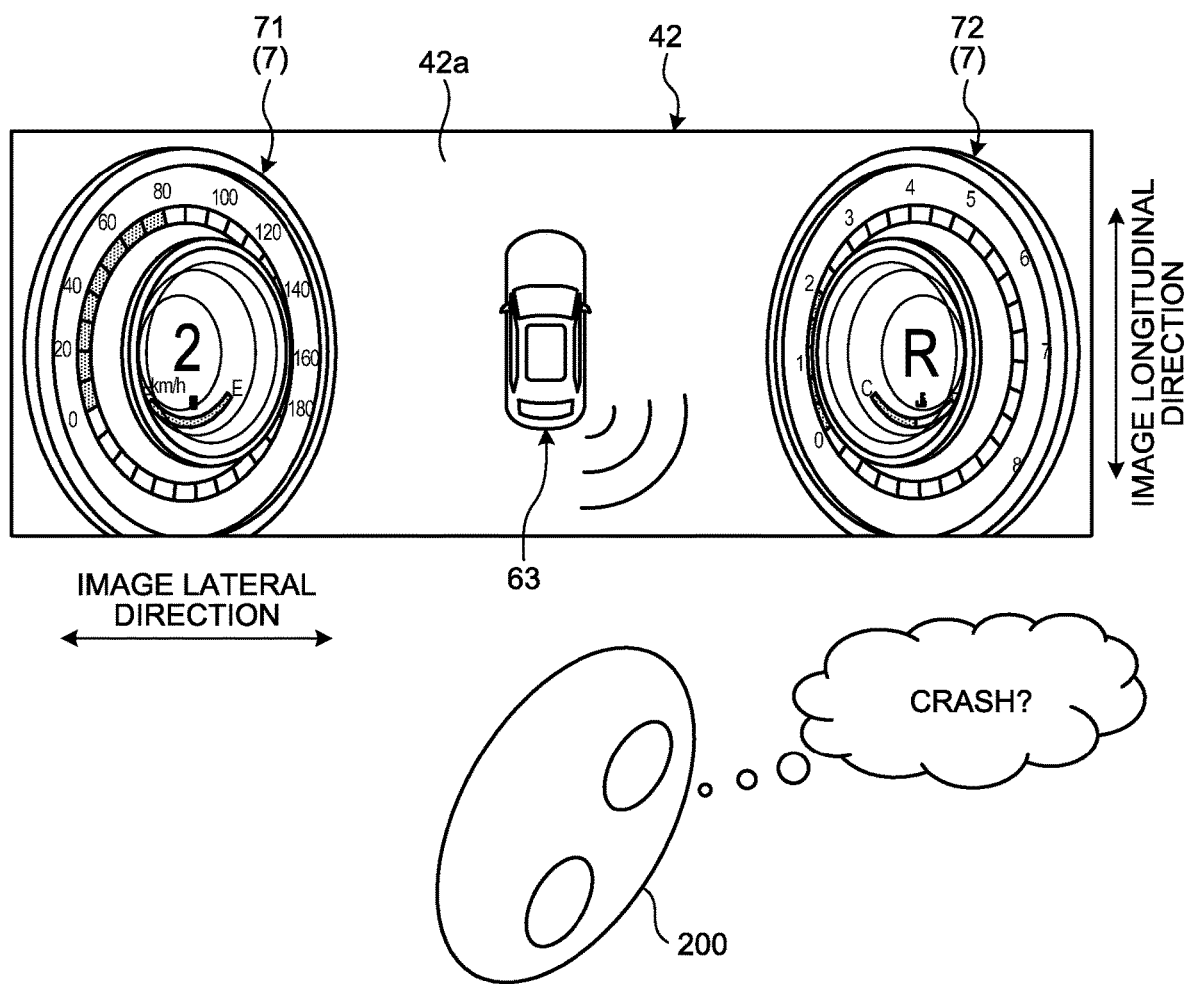
FIG. 10 is a diagram illustrating a look-back action of a driver.
Figure 11:
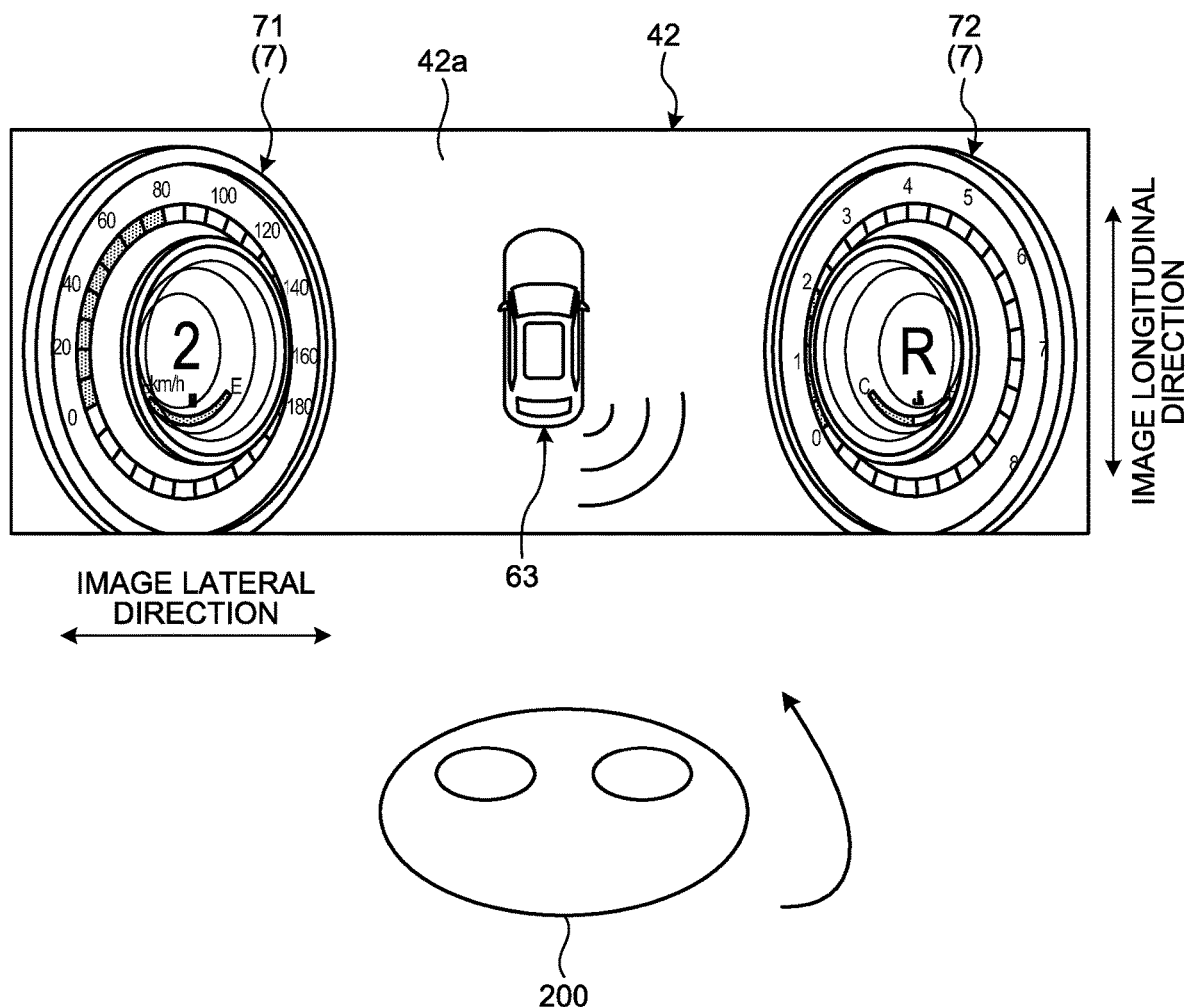
FIG. 11 is a diagram illustrating a gazing action of a driver.
Figure 12:
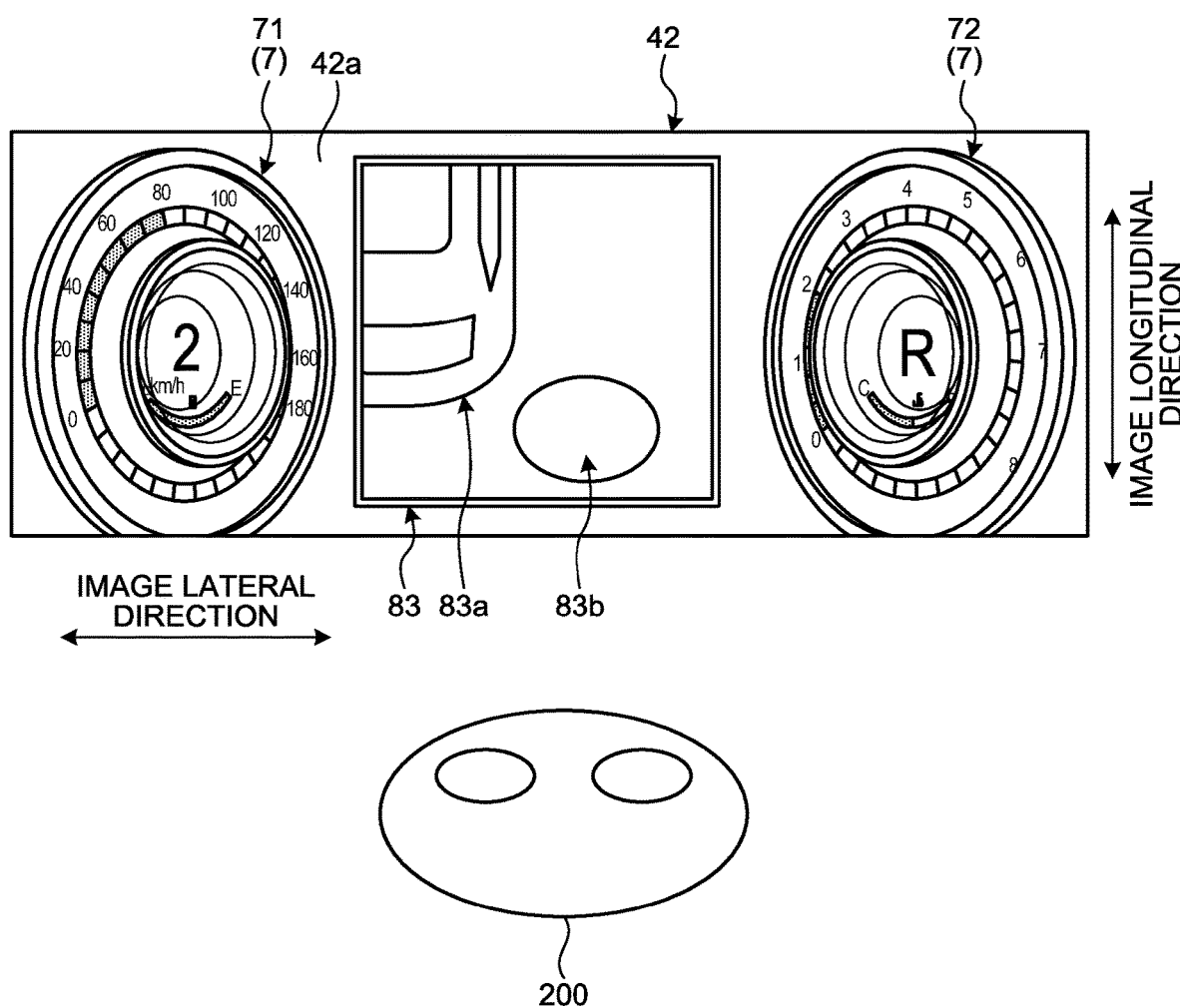
FIG. 12 is a diagram illustrating a second image according to the third embodiment.

A third embodiment will be described with reference to FIG. 9 to FIG. 12. In the third embodiment, the components having the same function as those described in the first embodiment and the second embodiment are represented with the same referential symbols, and the repeated explanation thereof is omitted. FIG. 9 is a diagram illustrating a first image according to the third embodiment. FIG. 10 is a diagram illustrating a look-back action of a driver. FIG. 11 is a diagram illustrating a gazing action of a driver. FIG. 12 is a diagram illustrating a second image according to the third embodiment. The third embodiment is different from the above-described first embodiment in the aspect that an enlarge view of a corner portion of the vehicle 100 is displayed as the second image 8, for example.

As illustrated in FIG. 9, the display part 42a displays a warning image 63 as the first image 6. The warning image 63 is an image for warning of the approach of the vehicle 100 to objects around the vehicle 100. The warning image 63 includes a bird's-eye image 63a of the vehicle 100, and an approach display 63b showing the approach to surrounding objects. The warning image 63 is displayed on the basis of detection results by the corner sensor. The warning image 63 is generated by the second monitoring unit 13, for example. The control unit 20 displays the warning image 63 obtained from the second monitoring unit 13 on the display part 42a.

FIG. 9 illustrates the warning image 63 displayed when the vehicle 100 is approaching an object on the rear right side in the state where the shift position is in R position. When the warning image 63 is displayed, the driver 200 intends to confirm the object approaching the vehicle 100. For example, the driver 200 looks back to the rear right side to visually recognize the object, as illustrated in FIG. 10. Then, if the approaching object is in a dead angle, the driver 200 is not able to visually recognize the object. The driver 200 having not visually recognized the object directs his/her face to the front side and gazes at the warning image 63, as illustrated in FIG. 11.

When the action of the driver 200 gazing at the warning image 63 is detected, the control unit 20 displays an obstacle image 83, as illustrated in FIG. 12. The obstacle image 83 is the second image 8 and replaces the warning image 63 for display. The obstacle image 83 includes a bird's-eye image 83a of the vehicle 100 and an image 83b of an obstacle. In the bird's-eye image 83a in the obstacle image 83, a part of the vehicle 100 is displayed. To be more specific, the bird's-eye image 83a displays a part of the vehicle 100 approaching the surrounding object. For example, if the vehicle 100 is approaching an object on the rear right side, the bird's-eye image 83a displays the rear right part of the vehicle 100.

The image 83b of an obstacle is an image of an object approaching the vehicle 100. The image 83b of an obstacle is an image captured by the external camera 53, for example. Note that the image 83b of an obstacle may be an image generated on the basis of the detection result by the various sensors 54, instead of an image captured by the external camera 53.

The obstacle image 83 is displayed on the display part 42a, which allows the driver 200 to easily confirm the position and the kind of the obstacle. When the warning of the approach to an obstacle is made, the action of gazing at the warning image 63 to confirm the warning contents is a natural action. The image 83b of an obstacle is displayed in accordance with the natural gazing action, which achieves warning display fitting for the sense of the driver 200.

As described above, the first image 6 according to the third embodiment is the warning image 63 warning of the approach of the vehicle 100 to an object around the vehicle 100. The second image 8 is the obstacle image 83 displaying surrounding objects and the part of the vehicle 100 approaching the surrounding objects. When the warning of the approach of the vehicle 100 to surrounding objects is made, a position of the object for warning relative to the vehicle 100 is important information for the driver 200. It is inferred that when the driver 200 gazes at the warning image 63, he/she desires information of the object for warning. In such a case, the obstacle image 83 is displayed, which achieves display fitting for the sense of the driver 200.

First Modification of Embodiments

The following will describe a first modification of the above-described first to third embodiments. The meter display 42 may display the first image 6 and the second image 8 by virtual images, instead of displaying the first image 6 and the second image 8 by real images.

Figure 13:
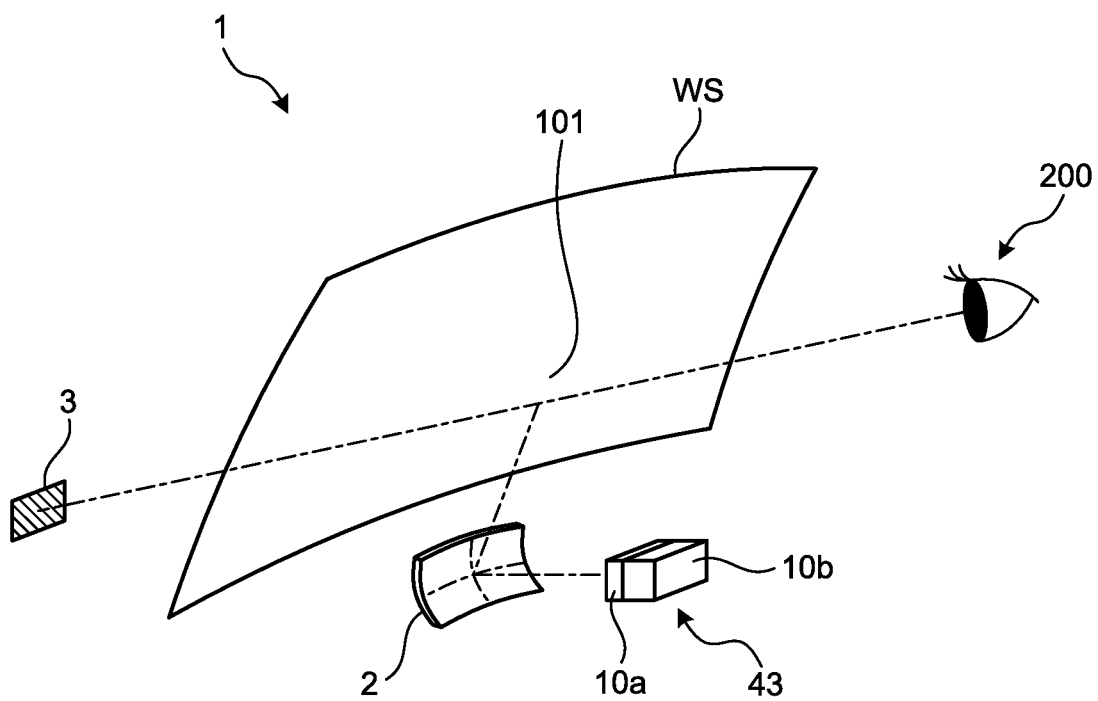
FIG. 13 is a diagram illustrating a head-up display device according to a first modification of the embodiments.

The display part displaying the first image 6 and the second image 8 is not limited to the meter display 42. For example, the first image 6 and the second image 8 may be displayed by the HUD 43. FIG. 13 is a diagram illustrating a head-up display device according to the first modification of the embodiments. The HUD 43 includes a display part 10*a*, a back light unit 10*b*, and a mirror 2, as illustrated in FIG. 13, for example. The display part 10*a* is a liquid crystal display device, for example. The image displayed by the display part 10*a* is projected to a reflection part 101 of a wind shield WS by the mirror 2. The projected image is reflected to the driver 200 by the reflection part 101. The image reflected by the reflection part 101 is visually recognized by the driver 200 as a virtual image 3 formed on the front side than the wind shield WS. The HUD 43 displays the first image 6 and the second image 8 as the virtual images 3.

The gazing action while the first image 6 is displayed by the HUD 43 may include an action of the driver 200 making his/her face approach the reflection part 101. When the gazing action is detected while the first image 6 is displayed, the control unit 20 replaces the first image 6 with the second image 8 for display by the HUD 43. The control unit 20 may expand the display range of the second image 8 than the display range of the first image 6.

The contents disclosed in the above-described embodiments and modification may be appropriately combined and executed.

The vehicle display device according to the embodiment includes a display part that is arranged in a vehicle and is configured to display a first image as an image of information related to the vehicle on a front side of a driver, a detector configured to detect an action of the driver, and a controller configured to change an image displayed on the display part from the first image to a second image when an action of the driver gazing at the first image is detected. The vehicle display device according to the embodiment displays the second image in accordance with the action of the driver gazing at the first image, thus exerting the effect of achieving display fitting for the request from the driver.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:
    a display part that is arranged in a vehicle and is configured to display, on a front side of a driver, a first image as an image of information related to the vehicle;
    a detector configured to detect an action of the driver; and
    a controller configured to change an image displayed on the display part from the first image to a second image when an action of the driver gazing at the first image is detected, wherein
    the first image is an image warning of approach of the vehicle to an object on a rear side of the vehicle, and
    in a state where the first image is displayed, when the action of the driver turning his/her face toward the rear side of the vehicle and then turning his/her face toward the front side of the vehicle and gazing at the first image is detected, the controller changes the first image to the second image that is an image displaying the object on the rear side of the vehicle and a part of the vehicle approaching the object on the rear side of the vehicle.

2. The vehicle display device according to claim 1, wherein
    the first image includes an image of the vehicle.

3. The vehicle display device according to claim 2, wherein
    the second image is an image of detailed information related to the first image.

4. The vehicle display device according to claim 2, wherein
    the action of the driver gazing at the first image includes an action of the driver making his/her face approach the first image.

5. The vehicle display device according to claim 1, wherein
    the second image is an image of detailed information related to the first image.

6. The vehicle display device according to claim 5, wherein
    the action of the driver gazing at the first image includes an action of the driver making his/her face approach the first image.

7. The vehicle display device according to claim 1, wherein
    the action of the driver gazing at the first image includes an action of the driver making his/her face approach the first image.

8. The vehicle display device according to claim 1, wherein
    the display part is configured to display a meter image related to a travelling state of the vehicle in addition to the first image, and
    the controller is configured to reduce a display size of the meter image and display the second image in a larger area than a display area previously occupied by the first image when the action of the driver gazing at the first image is detected.

\* \* \* \* \*